United States Patent [19]

McCord

[11] Patent Number: 4,582,733

[45] Date of Patent: Apr. 15, 1986

[54] METHOD FOR CLEANING AND COATING OBJECTS

[76] Inventor: James W. McCord, 9101 Nottingham Pkwy., Louisville, Ky. 40220

[21] Appl. No.: 568,346

[22] Filed: Jan. 5, 1984

Related U.S. Application Data

[63] Continuation-in-part of Ser. No. 393,757, Jun. 30, 1982, abandoned.

[51] Int. Cl.$^4$ ............................................. B05D 1/18
[52] U.S. Cl. ............................ 427/430.1; 106/14.34; 106/271; 134/31; 134/35; 252/172; 427/443
[58] Field of Search ..................... 106/14.05, 14.34; 252/172; 134/31, 35; 427/430.1, 443

[56] References Cited

U.S. PATENT DOCUMENTS 3,516,938  6/1970  Zisman et al. .................... 252/171
3,573,212  3/1971  Ambros .............................. 252/153

*Primary Examiner*—Lorenzo B. Hayes
*Attorney, Agent, or Firm*—Charles G. Lamb

[57] ABSTRACT

A chemical composition particularly useful in a vapor generating apparatus which includes at least one organic compound with two or less carbon atoms and a selected coating compound therein. Upon submersion of an object to be cleaned or dried in a boiling solution of the organic compound the object is not only cleaned or dried, but is also coated with a material which improves its resistance to, for example, erosion, corrosion, friction, and the like.

4 Claims, No Drawings

METHOD FOR CLEANING AND COATING OBJECTS

CROSS REFERENCE TO RELATED APPLICATIONS

This is a continuation-in-part of the application, Ser. No. 393,757 filed June 30, 1982 now abandoned.

BACKGROUND OF THE INVENTION

1. Field of the Invention

This invention relates to a chemical composition. More particularly, this invention relates to a solution for use in a vapor generating apparatus. Even more particularly, this invention relates to a chemical composition which is a mixture of a cleaning or drying solution and a solubilized or suspended coating compound. 2. Description of the Prior Art In the present state of the art, vapor generating and recovering apparatuses are used for cleaning or drying of objects, such as metallic tools, plastic parts, and the like. In a finishing application (cleaning or drying) of these objects, a solvent is heated to boiling and the object to be finished is immersed therein. The solvents used are usually chlorinated organic compounds having two or less carbon atoms.

SUMMARY OF THE INVENTION

It is an object of this invention to provide a unique chemical composition for cleaning or drying and coating objects. It is another object of this invention to provide a chemical solution for use at its boiling temperature in a vapor generating apparatus. It is even another object of this invention to provide an improved chemical composition for use in a vapor generating apparatus for adding a selected coating to an object during cleaning or drying. Other objects and advantages of this invention will become apparent upon reading the accompanying disclosure.

The present invention resides in the discovery that a solution for cleaning or drying objects may include a selected coating therein to enhance resistance to erosion, corrosion, friction, and the like. In a vapor cleaning or drying process the selected coating must be compatible with the cleaning or drying solution and also be capable of withstanding the boiling temperature of the cleaning solution without changing its chemical and physical properties. Particularly, coating compounds useful in the present invention include those compounds which dissolve in a selected cleaning or drying solution and have vaporizing temperatures greater than those of the selected cleaning compound. Some examples of coating compounds useful in this invention include, for example, dimethyl silicones, organo-silicone compounds, as well as fluorocarbons which are well known in the art for protecting articles from corrosion, erosion, friction, and the like. These include low molecular weight dimethyl silicones which are liquid linear, branched or cyclic dimethyl silicones, from the dimer through the octamer, of which the linear tetramer is preferred. Organosilicones suitable as solutes are liquid linear polyoxyalkylated dimethyl silicones of the formula:

$$(CH_3)_3SiO(CH_3)_2SiO_mSi(CH_3)_2(CH_2)_nO(C_2H_4O)_xCH_3$$

wherein m is an integer from 2 to 6, n is an integer from 1 to 3 and x is a number from 1 to 18, for example:

$$(CH_3)_3SiO(CH_3)_2SIO_6Si(CH_3)_2(CH_2)_3O(C_2H_4O)_{11}CH_3$$

Fluorosilicones suitable as solutes include the fluorosilicones containing the repeating unit, $$\begin{array}{c} CH_3 \\ -SiO- \\ CH_2CH_2CF_3 \end{array}$$

Suitable volatile liquid perfluoroalkanes and fully fluorinated bromo- and chloroalkanes for the liquid compositions of the invention are, for example, perfluoropentane, perfluorohexane, trichlorofluoromethane, dibromodifluoromethane, tribromofluoromethane, 1,1,2-trichloro-1,2,2-trifluoroethane, 1,2-dibromo-1,1,2,2-tetrafluoroethane, 1,1,2-trichloro-2,2,3,3,3-pentafluoropropane, 1,1,1,3-tetrachloro-2,2,3,3-tetrafluoropropane and 2,2,3-trichloro-1,1,1,3,4,4,4-heptafluorobutane mixtures thereof, and 1,1,2,2-tetrachloro-1,2-difluoroethane. One preferred flourinated hydrocarbon useful in the present invention is tetrafluoroethylene. Also silicon containing oil compounds, and beeswax have also been found useful in the present invention. Vegetable oils, such as soybean oil, peanut oil, corn oil, sunflower oil, palm oil, linseed oil, and the like as well as fish oil or animal oils, petrolatums, such as mineral oil, paraffin, and the like may also be used. However, these coating compounds are merely exemplary and are not intended to be unduly limitative of the present invention.

The cleaning and drying compounds which have been found compatible with the coating compounds include the non-polar solvents, such as the halogenated organic compounds with two or less carbon atoms. These include, for example, trifluoromethane, trichloromonofluoromethane, trichlorotrifluoroethane, methylene chloride, methyl chloroform, perchloroethylene, and the like. These non-polar solvents may be mixed with or used in the absence of water.

The composition within the scope of this invention for cleaning or drying comprises a solution containing from about 0.1 to 10 percent by weight of the coating compound in a solution containing at least one organic compound having two or less carbon atoms. In a preferred embodiment from about 2 to 5 percent by weight of the coating compound is used in a solution containing at least one halogenated organic compound. And preferably, cleaning or drying and coating is carried out at the boiling temperature of the composition mixture. In some applications compatible surface active agents may be used.

According to the present invention, objects to be cleaned or dried and protected from corrosion, erosion, friction, and the like are immersed in, preferably, a boiling solution of a composition including the coating compound and an organic compound having two or less carbon atoms. The time of the immersion is usually relatively short, generally being accomplished within about 1 minute. Upon removal from the boiling solution, the solvent vaporizes off leaving the coating on the object which has been cleaned or dried. Furthermore, spraying or other means for subjecting the object to be treated in the boiling solution may also be used without departing from the scope and spirit of this invention.

Since the coating compound is compatible with organic compounds and water, mixing of the compounds does not require any special technique.

A more comprehensive understanding of the invention can be obtained by considering the following examples. However, it should be understood that the examples are not intended to be unduly limitative of the invention.

EXAMPLE I

The following example demonstrates one procedure that is followed in preparing and using a composition of the present invention for treating engine parts.

A solution is prepared by adding 10 parts by weight of a mineral oil to 90 parts by weight of trichlorotrifluoroethane in a vapor generating apparatus. The solution is brought to boiling wherein engine parts are immersed therein for about 30 seconds.

The engine parts immersed in the solution are cleaned and coated uniformily with the oil upon removal from the boiling solution.

EXAMPLE II

The following example demonstrates one procedure that is followed in treating a mold for plastic parts with a composition of the present invention.

A solution is prepared by adding 2 parts by weight of tetrafluoroethylene to 98 parts by weight of trichlorotrifluoroethane in a vapor generating apparatus. The solution is brought to boiling wherein a mold for plastic parts is immersed therein for removal of water (drying), the immersion time being about 30 seconds.

The mold immersed in the solution will be clean upon removal from the boiling solution and coated uniformly with the tetrafluoroethylene.

EXAMPLE III

The following example demonstrates one procedure that is followed in preparing and using a composition of the present invention for treating a blood filter to prevent the foaming of blood during filtration.

A solution is prepared by adding 30 parts by weight of a silicon oil to 70 parts by weight of trichloromonofluoromethane in a vapor generating apparatus. The solution is brought to boiling wherein blood filters are immersed therein for about 1½ minutes.

The filters immersed in the solution will be free of foreign materials upon removal from the boiling solution and uniformly coated with a silicon protective coating.

EXAMPLE IV

The following example demonstrates one procedure that is followed in preparing and using a composition of the present invention for treating a ceramic circuit board.

A solution is prepared by adding 88.5 parts by weight of trichlorotrifluoroethane, 10 parts by weight of N-methyl pyrrollidone, 1 part by weight of beeswax and 0.5 parts by weight of water in a vapor generating apparatus. The solution is brought to boiling wherein a ceramic circuit board is immersed therein for about 30 seconds.

The ceramic circuit board immersed in the solution will be clean upon removal from the boiling solution and uniformly coated with a protective coating of beeswax.

What is claimed is:

1. A method of cleaning and coating objects with a chemical composition, comprising the steps of:
   preparing a chemical composition comprising from about 0.1 to 10 percent by weight of a coating compound in a solution containing at least one halogenated organic compound with two or less carbon atoms, said coating compound being mixable in said halogenated organic compound, said coating compound having a boiling point higher than the boiling point of said halogenated organic compound, said coating compound being selected from the group consisting of petrolatum, tetrafluoroethylene, or beeswax;
   boiling the chemical composition;
   immersing objects to be treated into the boiling chemical composition; and
   removing the treated objects from the boiling chemical composition whereby said halogenated organic compound vaporizes and said coating compound remains on said object.

2. The method of claim 1, said at least one halogenated organic compound is a non-polar solvent selected from the group consisting of trichloromonofluoromethane, trichlorotrifluoroethane, methylene chloride, methyl chloroform, perchloroethylene, and mixtures thereof.

3. The method of claim 1 including water.

4. The method of claim 1, said coating compound being tetrafluoroethylene.

* * * * *